US008264974B1

(12) United States Patent
Narin et al.

(10) Patent No.: US 8,264,974 B1
(45) Date of Patent: Sep. 11, 2012

(54) SYSTEMS AND METHODS FOR MULTI-CHANNEL NETWORK INFORMATION COLLECTION

(75) Inventors: Dogu Narin, Sunnyvale, CA (US); Siobhan Tully, Windham, NH (US)

(73) Assignee: Juniper Networks, Inc., Sunnyvale, CA (US)

( * ) Notice: Subject to any disclaimer, the term of this patent is extended or adjusted under 35 U.S.C. 154(b) by 1055 days.

(21) Appl. No.: 12/196,497

(22) Filed: Aug. 22, 2008

(51) Int. Cl.
*G01R 31/08* (2006.01)
(52) U.S. Cl. ........ 370/252; 370/352; 370/401; 370/242; 370/389; 709/221
(58) Field of Classification Search .................. None
See application file for complete search history.

(56) References Cited

U.S. PATENT DOCUMENTS

| 2004/0081079 | A1* | 4/2004 | Forest et al. | 370/216 |
| 2006/0007870 | A1* | 1/2006 | Roskowski et al. | 370/252 |
| 2007/0190996 | A1* | 8/2007 | Asthana et al. | 455/420 |
| 2009/0225683 | A1* | 9/2009 | Collins et al. | 370/255 |

* cited by examiner

*Primary Examiner* — Duc C Ho
(74) *Attorney, Agent, or Firm* — Harrity & Harrity, LLP

(57) ABSTRACT

A network device may include logic configured to receive a first problem report from a first network device in a first network, receive a second problem report from a second network device in a second network, receive reconfiguration information from a third network device in a third network, store event data included in the first and second problem reports, determine whether the event data included in the first or second problem reports is associated with the reconfiguration information, transmit at least one of the first or second problem reports to the third network device when the reconfiguration information is not associated with the event data included in the first or second problem reports and transmit the reconfiguration information to at least one of the first or second network devices when the reconfiguration information is associated with the event data included in the first or second problem reports.

20 Claims, 13 Drawing Sheets

SYSTEMS AND METHODS FOR MULTI-CHANNEL NETWORK INFORMATION COLLECTION

BACKGROUND INFORMATION

Event detection and management systems typically store conditions that, when satisfied, generate error messages within a network device. The error messages, such as an alert indicating a possible error, may be sent as a message to a remote location in another network. In many cases, the remote location in the other network is operated by a managed service provider. Network operators of the managed service provider commonly do not have adequate knowledge of processes within network devices because the managed service providers generally do not manufacture the network devices. Thus, network operators of the managed service providers may be alerted to errors, but the network devices may remain in failed states as network operators can not reconfigure the network devices to correct the errors.

SUMMARY

According to one aspect, a network device in a first network may include logic configured to receive a problem report from a second network device in a second network, where the problem report includes event data; receive reconfiguration information from a third network device in a third network, transmit the reconfiguration information to the second network device when the reconfiguration information is associated with the event data in the received problem report and transmit the received problem report when the reconfiguration information is not associated with the event data in the problem report.

According to another aspect, a method may include receiving a first problem report from a first network device in a first network; receiving a second problem report from a second network device in a second network; receiving reconfiguration information from a third network device in a third network; storing event data included in the first and second problem reports; determining whether the event data included in the first and second problem reports is associated with the reconfiguration information; transmitting at least one of the first or second problem reports to the third network device when the reconfiguration information is not associated with the event data included in the first or second problem reports; and transmitting the reconfiguration information to at least one of the first or second network devices when the reconfiguration information is associated with the event data included in the first or second problem reports.

According to yet another aspect, a network device may be provided. The network device comprising: means for receiving problem reports from a plurality of downstream network devices; means for identifying events included in the problem reports; means for receiving reconfiguration information from an upstream network device; means for associating identified events with a corresponding reconfiguration information; means for transmitting corresponding reconfiguration information to a downstream network device when the corresponding reconfiguration information is associated with the determined event included in the problem report; and means for transmitting the problem report to the upstream network device when there is no corresponding reconfiguration information associated with the determined event included in the problem report.

DETAILED DESCRIPTION OF PREFERRED EMBODIMENTS

The following detailed description refers to the accompanying drawings. The same reference numbers in different drawings may identify the same or similar elements.

Embodiments described herein may allow errors and/or events within network devices or elements to be detected, bundled with data in an XML event problem report bundle, and transmitted upstream to an information collection gateway. The information collection gateway may determine if reconfiguration information is associated with an event contained in the received XML event problem report bundle and may transmit the reconfiguration information to the network element from which the XML event problem report bundle was received. The information collection gateway may also determine if the XML event problem report bundle should be further transmitted upstream to the next network device (another information collection gateway or backend network device) for further processing if there is no reconfiguration information associated with the event included in the problem report. A backend network device may further process event and/or error data in order to create reconfiguration information to correct the event and/or error that occurred in a network element. The reconfiguration information may be obtained from the backend network device by the information collection gateway, and may be transmitted downstream to other information collection gateways and to the network element.

While some of the following description is provided mainly in the context of routers or other network devices or elements at layer 2 and/or layer 3 of the Open Systems Interconnection (OSI) Model, the principles and teachings may be applied to different types of network devices at different layers of communication (e.g., Multi-protocol label switching (MPLS) routers, a Synchronous Optical Network (SONET) add-drop multiplexers, a Gigabit Passive Optical network (GPONs) switches, a Synchronous Digital Hierarchy (SDH) network elements, etc.).

Figure 1A:
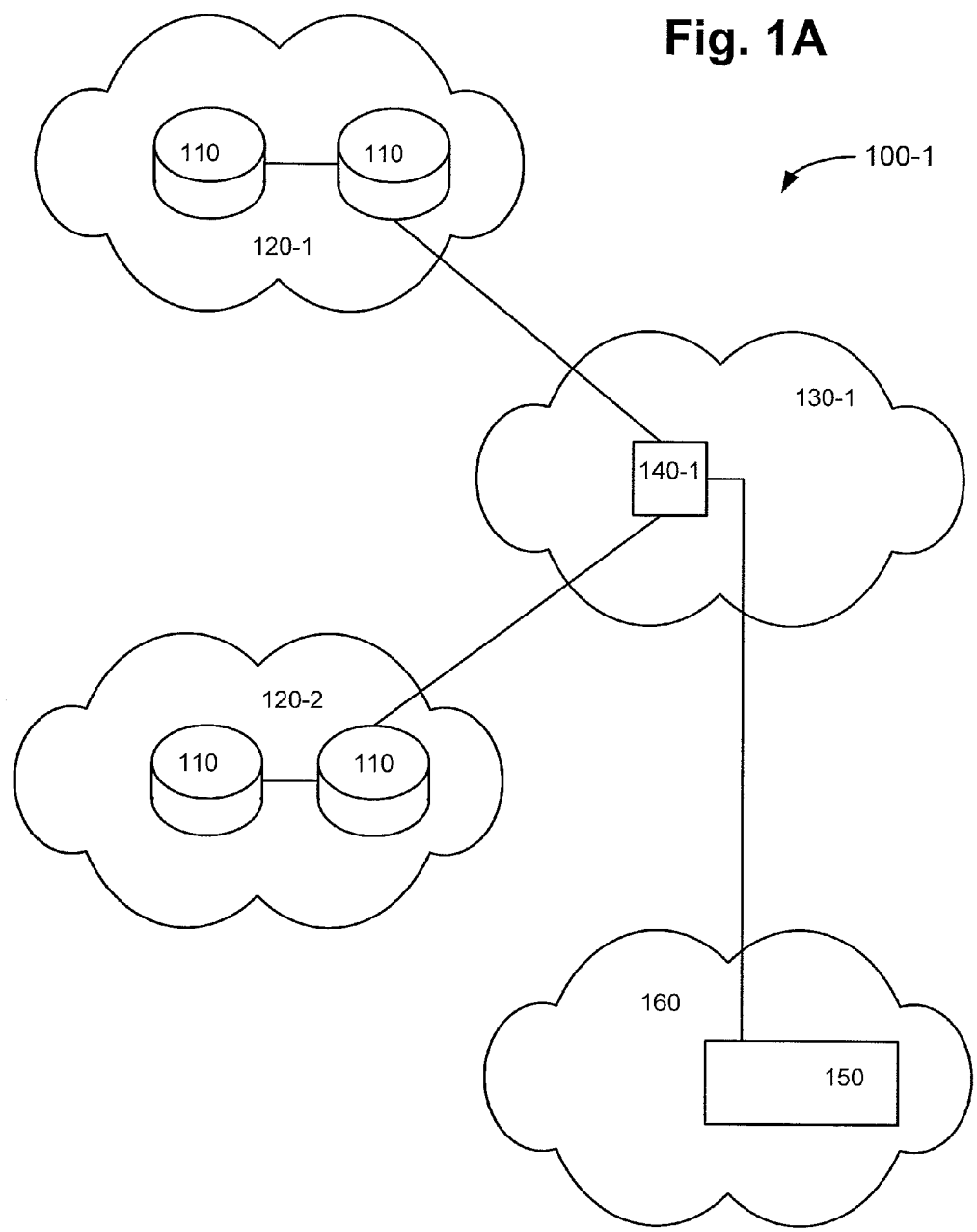
FIGS. 1A-1C show exemplary network configurations in which concepts described herein may be implemented.
Figure 1B:
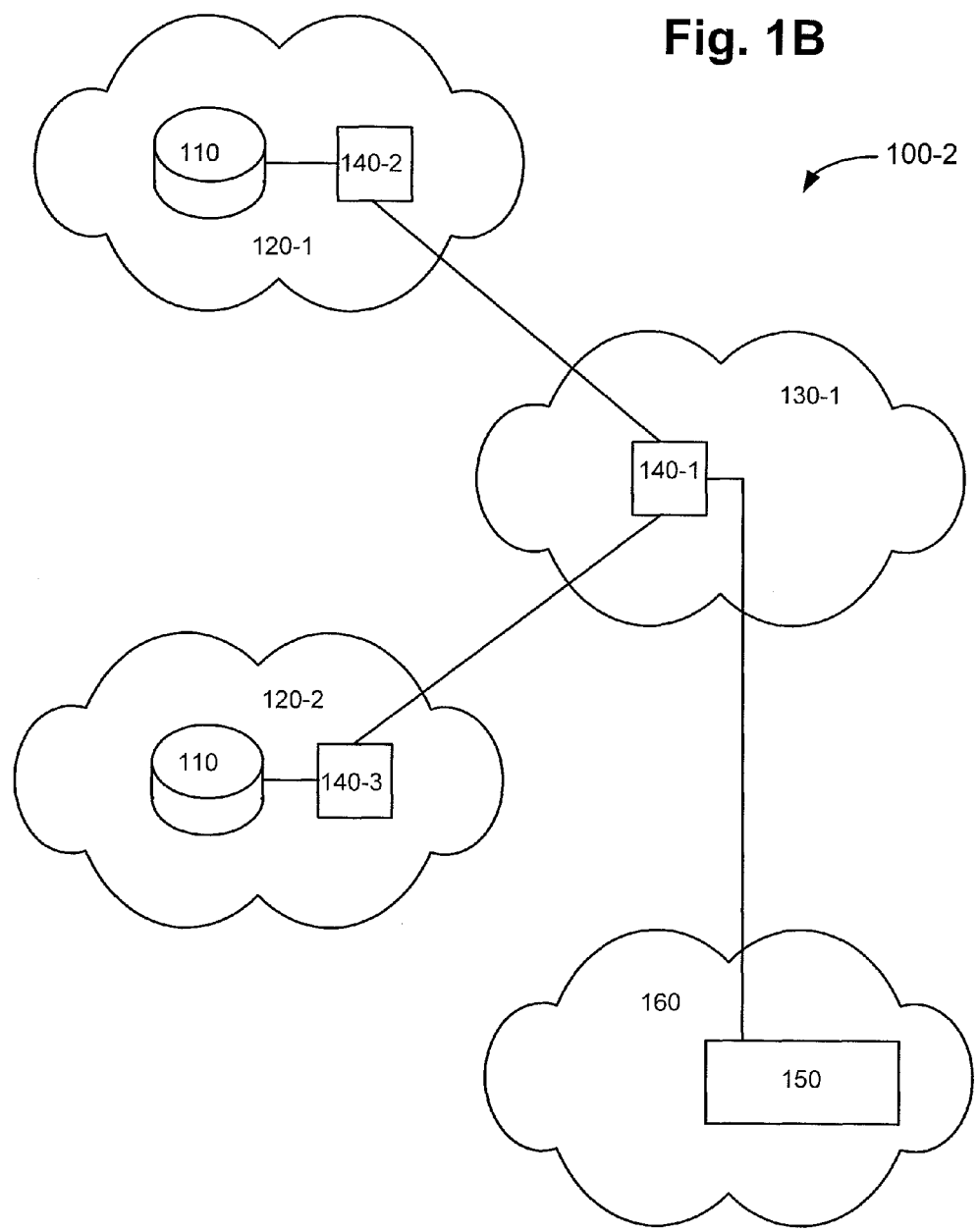
Figure 1C:
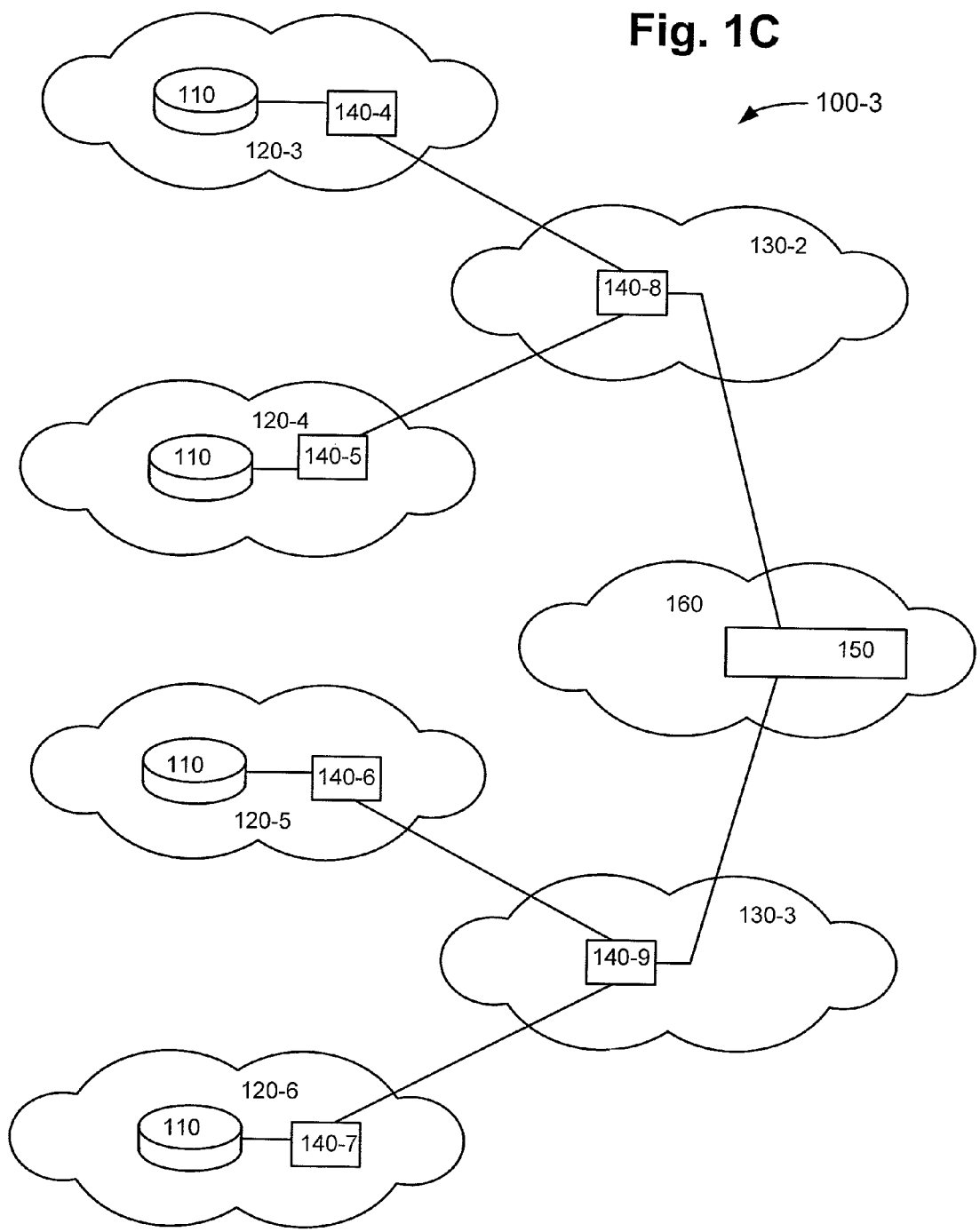

FIGS. 1A-1C depict exemplary network configurations in which concepts described herein may be implemented. As shown in FIG. 1A, a network 100-1 may include a number of network elements 110, networks 120-1 and 120-2, a managing service provider network 130-1, an information collection gateway 140-1, a backend network device 150, and a backend network 160. In practice, network 100-1 may include fewer, different, or additional elements than those illustrated in FIG. 1A.

Network elements 110 may include devices for performing network-related functions. For example, each of network elements 110 may include a router, a switch (e.g., a provider edge (PE) router in a MPLS network), etc.

Networks 120-1 and 120-2 may include the Internet, an ad hoc network, a local area network (LAN), a wide area network (WAN), a metropolitan area network (MAN), a cellular network, a public switched telephone network (PSTN), any other network, and/or a combination of networks. In this example, network 120-1 may be used and owned by a single company, such as "company A" and network 120-2 may be used and owned by another company, such as "company B."

Managing service provider network 130-1 may include an ad hoc network, a local area network (LAN), a wide area network (WAN), a metropolitan area network (MAN), a cellular network, a public switched telephone network (PSTN), any other network, and/or a combination of networks. In this example, managing service provider network 130-1 may be owned by "company C," where "company C" may be employed or contracted by "company A" to manage and provide service for network 120-1. Similarly, "company C" may also be employed or contracted by "company B" to mange and provide services for network 120-2.

Information collection gateway (ICG) 140-1 may include one or more devices for performing network-related functions, such as transmission and/or reception of network information to/from network elements 110 and/or backend network device 150.

Backend network device (BND) 150 may include one or more devices that receive network information from ICG 140-1, analyze received network information, and/or transmit reconfiguration information to ICG 140-1 based on the analyzed network information.

Backend network 160 may include a local area network (LAN) or a wide area network (WAN), any other network, and/or a combination of networks. In one example, backend network 160 may be owned and operated by "company D," that may be a manufacturer and/or a vendor of the network elements 110.

Network elements 110, ICG 140-1, and/or BND 150 may communicate with each other via wired or wireless communication links provided by networks 120-1, 120-2, 130-1 and 160.

As shown in FIG. 1B, a network 100-2 may include a number of network elements 110, networks 120-1 and 120-2, managing service provider network 130-1, information collection gateways 140-1, 140-2 and 140-3, backend network device 150, and backend network 160. As described above, network elements 110 may include one or more devices for performing network-related functions (e.g., a router, a switch (e.g., a provider edge (PE) router in a MPLS network), etc.).

Networks 120-1 and 120-2 may include the Internet, an ad hoc network, a local area network (LAN), a wide area network (WAN), a metropolitan area network (MAN), a cellular network, a public switched telephone network (PSTN), any other network, and/or a combination of networks. In this example, network 120-1 may be used and owned by a single company, such as "company A" and network 120-2 may be used and owned by another company, such as "company B."

Managing service provider network 130-1 may include an ad hoc network, a local area network (LAN), a wide area network (WAN), a metropolitan area network (MAN), a cellular network, a public switched telephone network (PSTN), any other network, and/or a combination of networks. In this example, managing service provider network 130-1 may be owned by "company C," where "company C" may be employed or contracted by "company A" to manage and provide service for network 120-1. Similarly, "company C" may also be employed or contracted by "company B" to mange and provide services for network 120-2.

Information collection gateways (ICGs) 140-1 to 140-3 may include one or more devices for performing network-related functions (in networks 130-1, 120-1 and 120-2 respectively), such as transmission and/or reception of network information to/from network elements 110, another ICG 140 and/or BND 150.

BND 150 may include one or more devices that receive network information from ICG 140-1, analyze received network information, and/or transmit reconfiguration information to ICG 140-1 based on the analyzed network information.

Backend network 160 may include a local area network (LAN) or a wide area network (WAN), any other network, and/or a combination of networks. In one example, backend network 160 may be owned and operated by "company D," that may be a manufacturer and/or vendor of the network elements 110.

Network elements 110, ICGs 140-1 to 140-3, and/or BND 150 may communicate with each other via wired or wireless communication links provided by networks 120-1, 120-2, 130-1 and/or backend network 160.

As shown in FIG. 1C, a network 100-3 may include network elements 110, networks 120-3 to 120-6, managing service provider networks 130-2 and 130-3, information collection gateways 140-4 to 140-9, BND 150 and backend network 160. As described above, network elements 110 may include one or more devices for performing network-related functions (e.g., a router, a switch (e.g., a provider edge (PE) router in a MPLS network), etc.).

Networks 120-3 to 120-6 may include the Internet, an ad hoc network, a local area network (LAN), a wide area network (WAN), a metropolitan area network (MAN), a cellular network, a public switched telephone network (PSTN), any other network, and/or a combination of networks. In one example, networks 120-3 to 120-6 may be independent networks owned and operated by two separate companies. In this example, "company E" may own network 120-3, "company F" may own network 120-4, "company G" may own network 120-5, "company H" may own network 120-6.

Managing service provider networks 130-2 and 130-3 may include an ad hoc network, a local area network (LAN), a wide area network (WAN), a metropolitan area network (MAN), a cellular network, a public switched telephone network (PSTN), any other network, and/or a combination of networks. In this example, managing service provider network 130-2 may be owned by "company I," where "company I" may be employed or contracted by "company E" to manage and provide service for network 120-3. Similarly, "company I" may also be employed or contracted by "company F" to mange and provide services for network 120-4. Also in this example, managing service provider network 130-3 may be owned by "company J," where "company J" may be employed by "company G" to manage and provide service for network 120-5. Similarly, "company J" may also be employed by "company H" to mange and provide services for network 120-6.

Information collection gateways (ICGs) 140-4 to 140-9 may include one or more devices for performing network-related functions, such as transmission and/or reception of network information to/from network elements 110, another ICG 140 and/or backend network device 150. ICGs 140-4 to 140-9 may be configured similarly, and/or may be referred to collectively as an ICG 140.

BND 150 may include one or more devices that receive network information from ICGs 140-8 and 140-9, analyze received network information, and/or transmit reconfiguration information to ICGs 140-8 and 140-9 based on the analyzed network information.

Backend network 160 may include a local area network (LAN) or a wide area network (WAN), any other network, and/or a combination of networks. In one example, backend network 160 may be owned and operated by "company K," that may be a manufacturer and/or vendor of the network elements 110.

Network elements 110, ICGs 140-4 to 140-9, and/or BND 150 may communicate with each other via wired or wireless communication links provided by networks 120-3 to 120-6, 130-2 to 130-3 and/or backend network 160.

Although FIGS. 1A-1C show exemplary components of networks 100-1 to 100-3, in other implementations, networks 100-1 to 100-3 may contain fewer, different, or additional components than depicted in FIGS. 1A-1C. In still other implementations, one or more components of networks 100-1 to 100-3 may perform one or more of the tasks described as being performed by one or more other components of networks 100-1 to 100-3.

Figure 2:
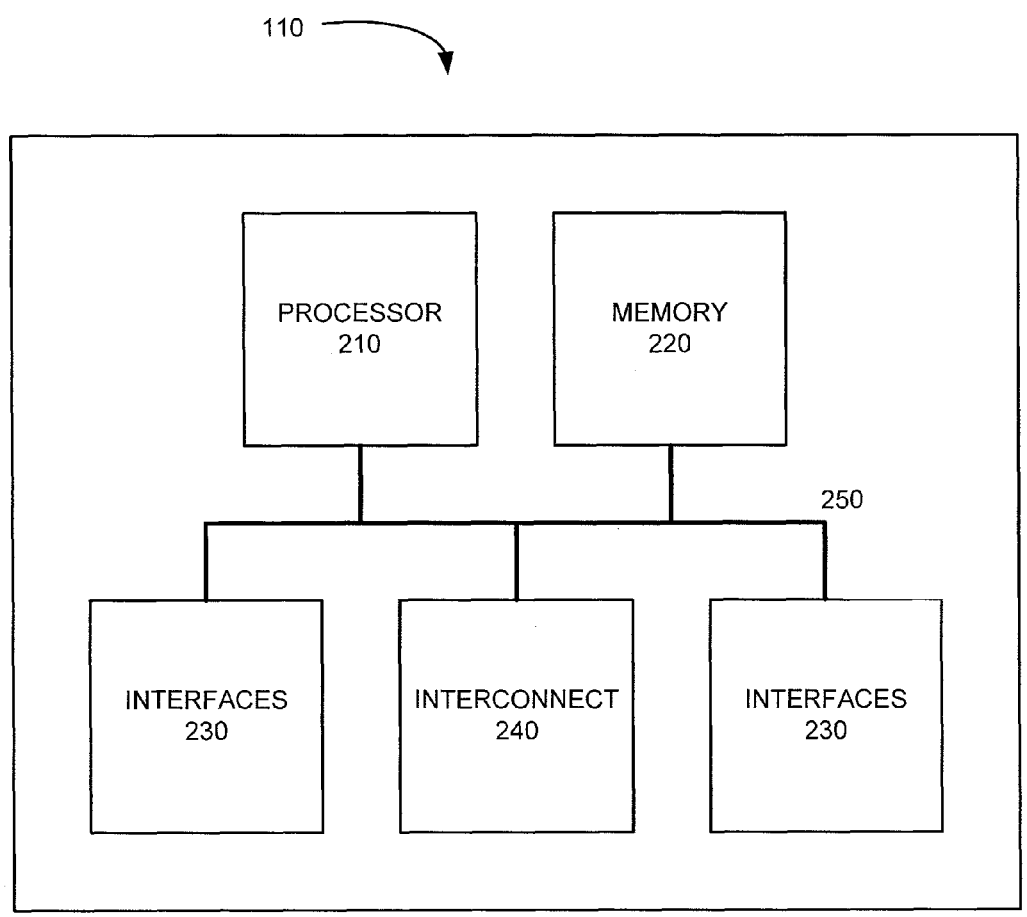
FIG. 2 is a block diagram of an exemplary network device of FIG. 1.

FIG. 2 shows an exemplary block diagram of exemplary components of one of network elements 110. As shown, a network element 110 may include a processor 210, memory 220, interfaces 230, an interconnect 240, and a bus 250. In other implementations, network element 110 may include fewer, additional, or different components than those illustrated in FIG. 2.

Processor 210 may include one or more processors, microprocessors, application specific integrated circuits (ASICs), field programming gate arrays (FPGAs), and/or processing logic optimized for networking and communications.

Memory 220 may include static memory, such as read only memory (ROM), dynamic memory, such as random access memory (RAM), and/or onboard cache, for storing data and machine-readable instructions. Memory 220 may also include storage devices, such as a floppy disk, a CD ROM, a CD read/write (R/W) disc, and/or flash memory, as well as other types of storage devices.

Interfaces 230 may include one or more devices for receiving incoming data streams from networks and/or for transmitting data to networks. For example, interfaces 230 may include Ethernet cards, optical carrier (OC) interfaces, asynchronous transfer mode (ATM) interfaces, etc.

Interconnect 240 may include one or more switches or switch fabrics for directing incoming network traffic from one of interfaces 230 to another one of interfaces 230.

Bus 250 may include a path that permits communication among processor 210, memory 220, interfaces 230, and/or interconnects 240.

The components depicted in FIG. 2 may provide fewer or additional functionalities. For example, if network element 110 performs an Internet Protocol (IP) packet routing function as part of a MPLS router, processor 210 may perform tasks associated with obtaining routing information from other routers in a MPLS network. In such cases, conveying network traffic from one of interfaces 230 to another one of interfaces 230 may involve label based routing, rather than IP address based routing.

Figure 3:
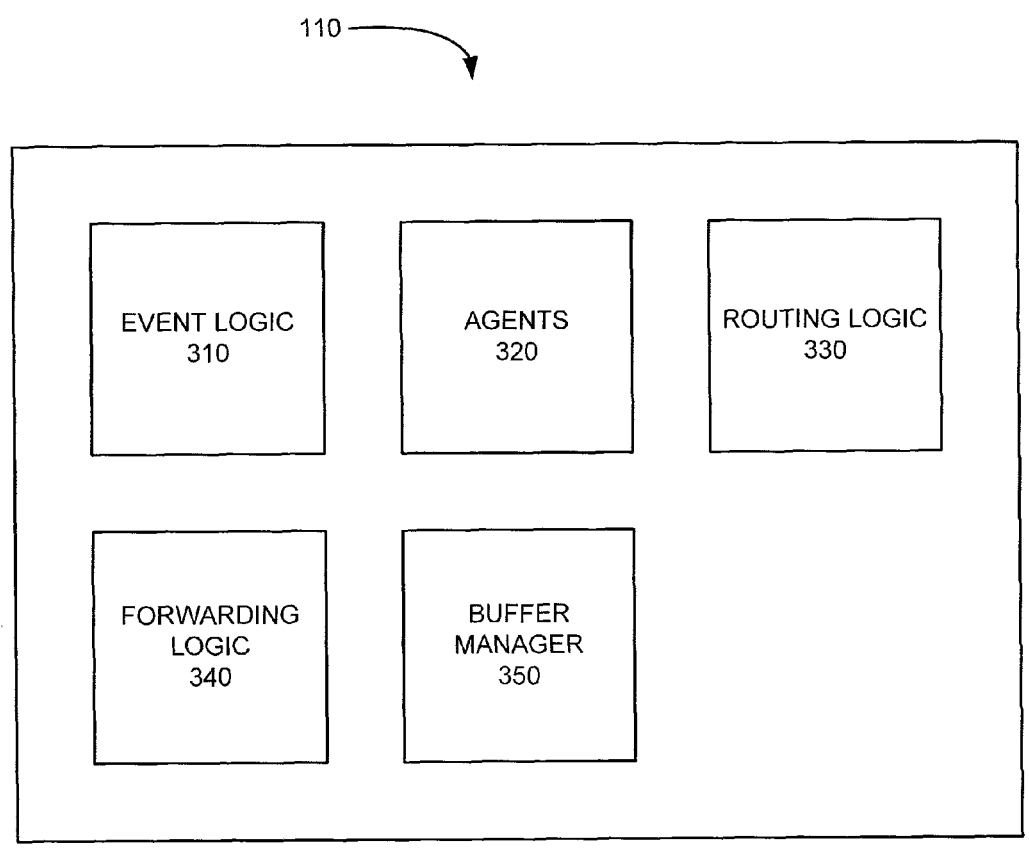
FIG. 3 is a functional block diagram of the network device of FIGS. 1 and 2.

FIG. 3 is a block diagram depicting exemplary functional components of one of network elements 110. As shown, network element 110 may include event logic 310, agents 320, routing logic 330, forwarding logic 340, and/or buffer manager 350. In other implementations, network element 110 may include fewer, additional, or different components than those illustrated in FIG. 3. For example, network element 110 may or may not provide certain network management functions, and in such instances, network element 110 may not include certain agents 320.

Event logic 310 may include hardware and/or software-based logic for performing various event driven functions for management and operation of network element 110. Event logic 310 may create and transmit an XML problem report bundle, based on a detected event, to other network elements 110. For example, event logic 310 may provide embedded reactive and proactive scripts used to collect and analyze data to monitor performance within network element 110. Event logic 310 may correlate events and/or time periods, and, in response to the analysis of correlated events/time periods, may make decisions to reconfigure operations of network element 110. Event logic 310 may provide an interface that may transmit and/or receive XML problem report bundles to/from another network device (such as another network element 110 and/or ICG 140). Additional information about event logic 310 is provided below in connection with FIG. 4.

Agents 320 may include hardware and/or software-based logic for monitoring and/or controlling components on behalf of event logic 310. The monitored components may include a physical device (e.g., a plug-in card, a multiplexer, a switch, etc.) or a logical device (e.g., a virtual connection or a logical interface). When monitoring the components, agents 320 may detect a fault and/or a recovery of an interface, an interconnect, and/or any other component of network element 110, and/or may report the fault and/or the recovery to event logic 310. For example, agents 320 may detect a failure of one of interfaces 230, and/or may send associated alarms and/or error messages to event logic 310. In another example, agents 320 may receive commands from a remote device, and/or may make appropriate configuration changes to interfaces 230. In other implementations, agents 320 may be attached and/or connected to other subcomponents of network element 110.

Routing logic 330 may include hardware and/or software-based logic for communicating with other routers to gather and/or store routing information in a routing information base (RIB).

Forwarding logic 340 may include hardware and/or software-based logic for directing a packet to a proper output port on one of interfaces 230 based on routing information in the RIB.

Buffer manager 350 may include a buffer for queuing incoming packets. If packets arrive simultaneously, one or more of the packets may be stored in the buffer until higher priority packets are processed and/or transmitted.

Figure 4:
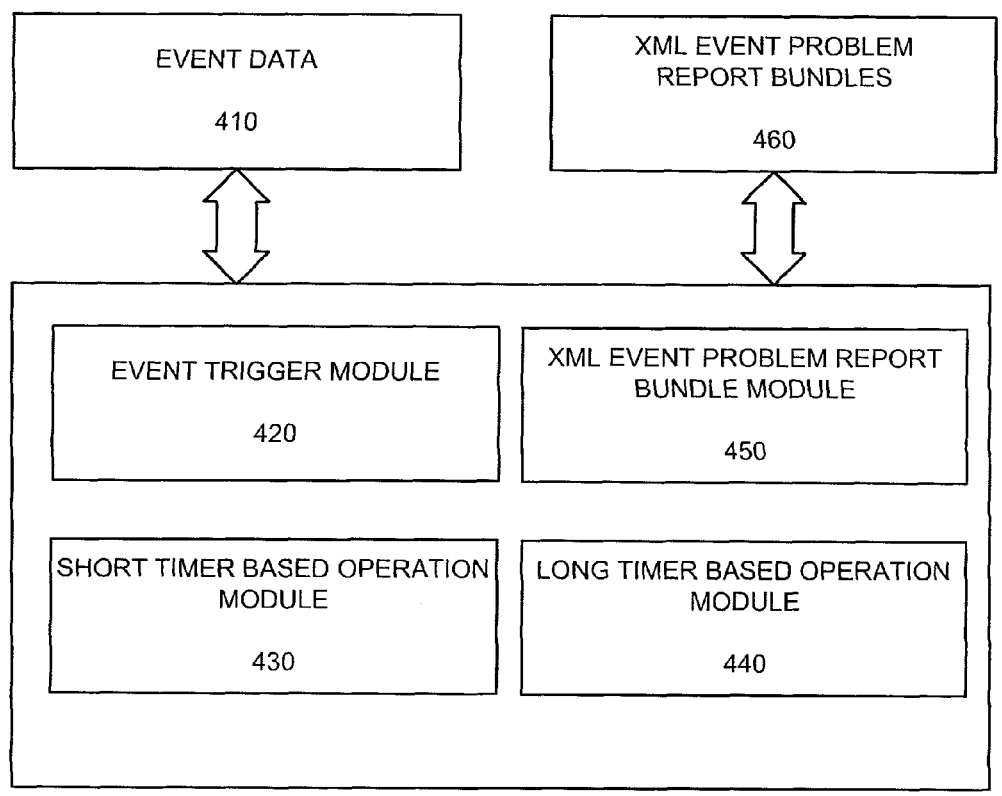
FIG. 4 is a functional block diagram of event logic of FIG. 3.

FIG. 4 depicts a block diagram of exemplary functional components of event logic 310. As shown, event logic 310 may include an event trigger module 420, a short timer-based operation module 430, a long timer-based operation module 440 and an XML event problem report bundle module 450. As further shown in FIG. 4, event logic 310 may transmit and/or receive event data 410 and/or XML event problem report bundles 460. In different implementations, event logic 310 may include fewer, additional, or different components than those illustrated in FIG. 4.

Event data 410 may include information related to events and/or the status of hardware and software contained within network element 110. For example, the components shown in FIG. 2, such as processor 210, memory 220, interfaces 230, and/or interconnect 240, may provide signals and information identifying certain events. For example, processor 210 may provide event data 410 that includes information relating to the status of internal registers becoming overloaded and/or unused. The functional components shown in FIG. 3 may provide event data 410 that includes information related to status and/or events. For example, routing logic 330 may provide event data 410 that includes information indicating a processing failure regarding the routing information base (RIB).

Event trigger module 420 may include hardware and/or software-based logic that may receive a signal from XML problem report bundle module 450, and may invoke a script. For example, a process may be contained within a script that may identify a hardware or software problem, collect data relating to the identified problem, perform an analysis of the collected data, perform a corrective action based on the analysis, and/or send the collected data to XML event problem report bundle module 450. The analysis performed by an invoked script within event trigger module 420 may include any appropriate analysis algorithm, such as, for example, a decision tree or an artificial intelligence database. The specific type of analysis performed by each script may be determined by the specific event/policy that invoked the script. For example, if event data 410 contains information that a particular component of network element 110 is using 90% of processor resources, a script contained in event trigger module 420 may be invoked by XML problem report bundle module 450 to collect data and to determine what component is using the resources, what is the nature of the problem, and/or what if any corrective actions may be taken. Scripts invoked by event trigger module 420 may be referred to as "reactive" scripts, as these scripts may be invoked to react to a received event.

Short timer-based operation module 430 may include hardware and/or software-based logic that may receive a signal from XML event problem report bundle module 450, and/or may invoke a script. For example, upon detection of an event and/or short timer value expiring, XML event problem report bundle module 450 may invoke a script contained in short timer based operations module 430. Scripts contained in short timer-based operation module 430 may identify a hardware and/or software problem, collect data relating to the identified problem, perform an analysis of the collected data, perform a corrective action based on the analysis, and/or send collected data to XML event problem report bundle module 450. The analysis performed by an invoked script within short timer based operation module 430 may include any appropriate analysis algorithm such as, for example, a decision tree or an artificial intelligence database. The specific type of analysis performed by each script may be determined by a specific short timer value that may have expired within XML event problem report bundle module 450. Scripts invoked by short timer-based operation module 430 may also be referred to as "reactive" scripts, as they may be invoked to react to expiration of a short timer value.

Long timer-based operation module 440 may include hardware and/or software based logic that may receive a signal from XML event problem report bundle module 450, and/or may invoke a script. For example, upon detection of an event or long timer value expiring, XML problem report bundle module 450 may invoke a script contained in long timer-based operation module 440. For example, a script contained in long timer based operation module 440 may collect data, and/or may transmit the collected data to XML event problem report bundle module 450 to create XML event problem report bundles 460. XML event problem report bundles 460 may be transmitted to another network device to be analyzed to determine long term trends of network element 110. Data collected by a script invoked by long timer based operation module 440 may be strategically analyzed (e.g., by BND 150) to determine potential risks and/or failures that may occur within network element 110. Scripts invoked by long timer-based operation module 440 may be referred to as proactive scripts, as the data collected and analyzed may relate to successful operations of network element 110, and may be used to "proactively" reconfigure hardware and/or software within network element 110 before a problem and/or error occurs.

XML event problem report bundle module 450 may include event policies and/or time periods that may be used to process received event data 410, and, in response to the received event, time period, etc, to invoke scripts contained in modules 420-440. For example, XML event problem report bundle module 450 may store events and/or information relating to an appropriate script and/or module 420-440 to invoke. After determining an appropriate script to invoke, XML event problem report bundle module 450 may send signals and/or information to the appropriate module (e.g., modules 420-440) so that further processing of data may be performed. XML event problem report bundle module 450 may receive data collected by the scripts invoked (e.g., by modules 420-440), and/or may form XML event problem report bundles 460 with the collected data. For example, XML event problem report bundle module 450 may store XML document structures, parameters, and/or tagged fields relating to all the types of events, short time periods, and/or long time periods that may be detected. Each event and/or time period may be associated with an appropriate XML document and/or file structure that may include XML header information and/or XML payload information. In one example, XML event problem report bundle module 450 may receive data collected from a script contained in event trigger module 420 that relates to a detected interface failure. This collected data may be received by XML event problem report bundle module 450, and/or an appropriate XML file header may be determined based on the invoked script. Based on the parameters contained in the XML header file, specific XML payload files may be determined. Using the data received from the script, XML event problem report bundle module 450 may tag the data in order to generate the XML header file and/or corresponding XML payload files. XML event problem report bundle module 450 may bundle the XML header file and/or corresponding XML payload files for transmission to ICG 140 and to BND 150 as XML event problem report bundles 460.

XML event problem report bundles 460 may include XML header files and/or XML payload files that contain data and/or information collected by scripts contained in modules 420-440. Data contained in XML header files may include predefined XML tagged fields used to describe and/or label information. Each of XML event problem report bundles 460 may contain four sections (e.g., one XML header file (manifest) section, and three sections of XML payload files such as a configuration section, a trend section and attachments). The XML header file may contain tagged fields, such as, for example, host-event ID, service type, problem class, problem description, priority severity, problem priority, core file path, product name, host name, version information, time of event, core manifest, software stack trace, show chassis hardware, show chassis firmware, and/or problem synopsis. Using these exemplary fields, information contained in a XML header file may be identified and/or accessed by a recipient (e.g. ICG 140 and/or BND 150) of an XML event problem report bundle 460.

XML payload files included in an XML event problem report bundle 460 may include information in tagged fields. XML payload files may include sections such as a configuration section, a trend section, and/or attachments. The specific XML payload file sections may be determined by the problem class field identified in the XML header file. For example, if a problem class error is a hardware failure, specific tagged fields may be included in the XML payload files that provide information relating to the hardware failure. If, for example, the problem class error is a software error, specific tagged fields may be included in the XML payload files that provide information relating to the software error. Examples of tagged fields included in the trend section of the XML payload files may include fields, such as routing engine, show chassis routing engine, flexible PIC connector (FPC), show chassis FPC (brief), show chassis FPC (detail), show nhbd zones (T-series), show nhbd zones (M-series), show bchip ucode bind (M-series), packet forwarding engine (PFE), show PFE statistics traffic, system, show system buffers, show system processes extensive, show system uptime, (SCB), show chassis SCB, show chassis (feb), show chassis smf (brief), show chassis smf (detail), show chassis forwarding, etc. Using descriptive payload fields, information contained in XML payload files may be easily identified and/or accessed by a recipient of a XML problem report bundle 460.

In addition to files containing tagged fields of information, the XML payload files may include attachment files that may not include tagged fields of information. For example, an exemplary attachment file may include numerical data relating to memory statistics by size, memory statistics by type, and/or other text information relating to memory operations within a network element 110. It should be understood that more, less, and/or different tagged fields of information may be included in XML event problem report bundles 460 based on any of the detected event, the invoked script, or the identified information contained in the problem class field included in the XML header file. In each instance, using specifically determined and descriptive tagged field names, a recipient (e.g., ICG 140 and/or BND 150) of an XML event problem report bundle 460 may quickly identify and access information associated with each specific event.

Figure 5:
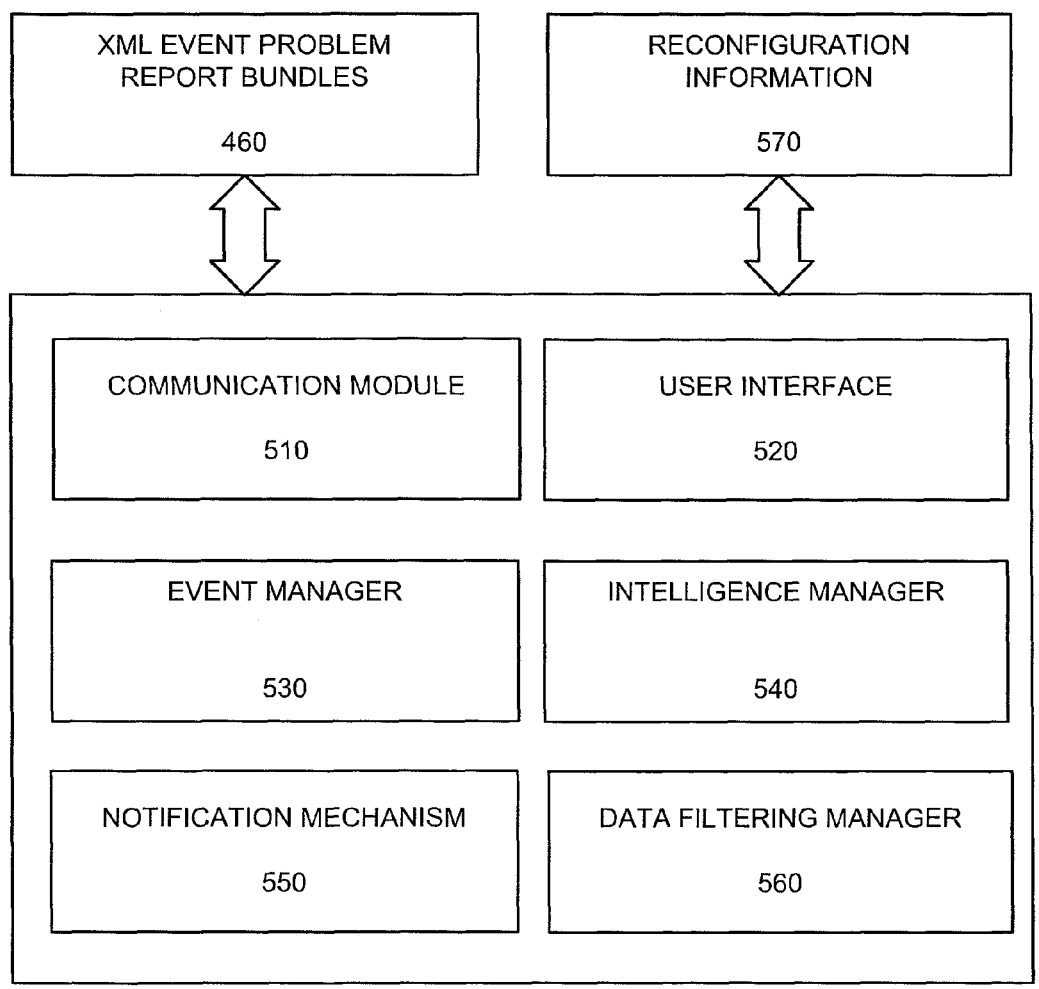
FIG. 5 is a functional block diagram of an exemplary information collection gateway of FIG. 1.

FIG. 5 depicts a block diagram of exemplary functional components of ICG 140. As shown, ICG 140 may include a communication module 510, a user interface 520, an event manager 530, an intelligence manager 540, a notification mechanism 550, and/or a data filtering manager 560. ICG 140 may transmit and/or receive XML event problem report bundles 460 and may transmit and/or receive reconfiguration information 570. In different implementations, ICG 140 may include fewer, additional, or different components than those illustrated in FIG. 5.

Communication module 510 may include one or more devices configured to transmit and/or receive XML event problem report bundles 460 and/or reconfiguration information 570 to/from a network element 110, another ICG 140 or BND 150. For example, communication module 510 may receive an XML event problem report bundle 460 from one of network elements 110 and may transmit the XML event problem report bundle 460 to another ICG 140 and/or backend network device 150. Communication module 510 may also transmit/receive reconfiguration information 570 to/from another ICG 140 and/or backend network device 150.

User interface 520 may include hardware and/or software-based logic for allowing an operator to interface with ICG 140. For example, user interface 520 may include a display and/or a keyboard, with which a user may interact with data displayed via a display. User interface 520 may provide information relating to events and/or errors within a network and may allow a user to determine if a received XML event problem report bundles 460 may be transmitted to another ICG 140 or BND 150.

Event manager 530 may include hardware and/or software-based logic that may receive an XML event problem report bundle 460 from one of network elements 110 and may store data with a corresponding event. For example, event manager 530 may store a memory error (identified in a received XML header file) with the corresponding memory data (identified in a received XML payload file). Event manager 530 may correlate and/or store events and/or data for a number of network elements within a network. As shown in FIG. 1A for example, event manager 530 contained in ICG 140-1 may store events and/or data for all network elements 110 in networks 120-1 and 120-2. As shown in FIG. 1C for example, event manager 530 contained in ICG 140-9 may store events and/or data for all network elements 110 in networks 120-5 and 120-6.

Intelligence manager 540 may include hardware and/or software-based logic that may receive an XML event problem report bundle 460 and/or may collect reconfiguration information 570 relating to identified events. Intelligence manager 540 may determine whether there is associated reconfiguration information 570 to correct the error and/or event identified in the received XML event problem report bundle 460. For example, ICG 140 may obtain reconfiguration information from another ICG 140 or BND 150 and/or may associate and store this reconfiguration information 570 with a corresponding type of error and/or event. In response to receiving an XML event problem report bundle 460, intelligence manager 540 may provide reconfiguration information 570 to one of network elements 110 based on the received type of event included in the XML event problem report bundle 460. In further examples, if intelligence manager 540 receives an updated software process (e.g., from BND 150), intelligence manager 540 may transmit the new software process (reconfiguration information 570) to all network elements 110 within a network 120.

Notification mechanism 550 may include hardware and/or software-based mechanisms for creating a link and/or notifying an operator of ICG 140 that a specific type of event and/or error has occurred, as determined from data within a received XML event problem report bundle 460. For example, notification mechanisms may include sending an email, alerting an administrator that a specifically identified type of error and/or event has occurred, etc.

Data filtering manager 560 may include hardware and/or software based mechanisms for identifying and/or filtering data within XML event problem report bundles 460. For example, data filtering manager 560 may filter received XML event problem report bundles 460 for identified types of events and types of XML event problem report bundles 460 and/or may determine if the received XML event problem report bundles 460 contain the identified type of event or type of data. For example, XML event problem report bundles 460 generated by the process described below in connection with FIG. 7 may be automatically identified and/or filtered to be transmitted to BND 150, whereas XML event problem report bundles 460 generated by the process described below in connection with FIG. 8 may be filtered to identify if they include specific types of events or errors that may be transmitted to BND 150 for further processing. For network security purposes, data filtering manager 560 may filter data within XML event problem report bundles 460 to ensure that no confidential information is contained within transmitted XML event problem report bundles 460.

Figure 6:
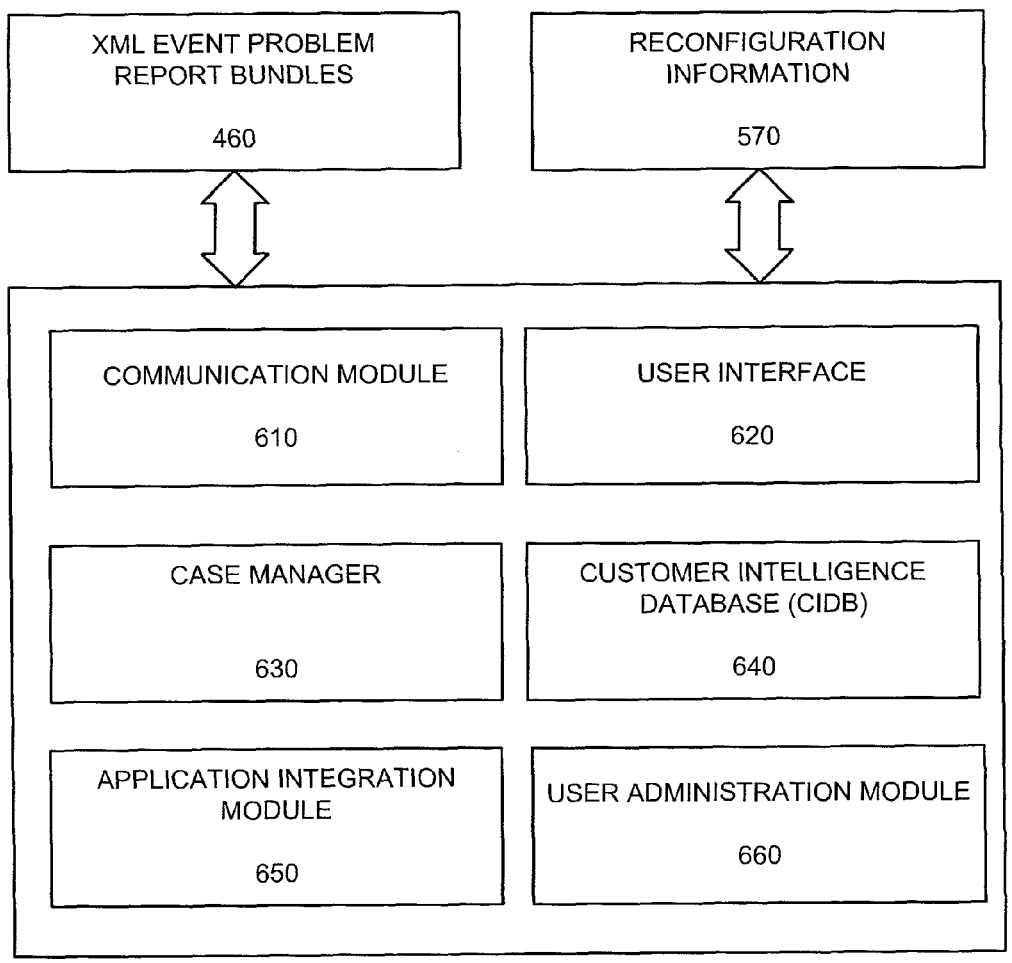
FIG. 6 is a functional block diagram of an exemplary backend network device of FIG. 1.

FIG. 6 depicts a block diagram of exemplary functional components of BND 150. As shown, BND 150 may include a communication module 610, a user interface 620, a case manager 630, a customer intelligence database 640, an application integration module 650 and a user administration module 660. BND 150 may transmit and/or receive XML event problem report bundles 460 and/or reconfiguration information 570 to/from ICG 140. In different implementations, BND 150 may include fewer, additional, or different components than those illustrated in FIG. 6.

Communication module 610 may include one or more devices configured to receive XML event problem report bundles 460 and reconfiguration information 570 from ICG 140. For example, communication module 610 may receive XML event problem report bundles 460 from ICG 140. Communication module 610 may also receive reconfiguration information 570 from ICG 140.

User interface 620 may include hardware and/or software-based logic for allowing an operator to interface with BND 150. For example, user interface 620 may include a display and/or a keyboard, with which a user may interact with BND 150. User interface 620 may provide alerts and/or issues detected within networks 120 and/or may allow a user to display and/or analyze data included in received XML event problem report bundles 460.

Case manager 630 may include mechanisms to receive XML event problem report bundles 460 and produce a link and/or a new case trouble ticket. For example, case manager 630 may include a customer relationship manager (CRM) tool that may directly map to and extract information contained in a received XML header file in order to form a new case problem ticket and a corresponding case ID. For example, information contained in tagged fields (e.g., problem description, platform, time of problem, serial number, priority, severity of event, etc.) may be automatically extracted and/or a placed into a new case problem ticket.

Customer Intelligence Database CIDB 640 may include hardware and/or software-based logic that may receive XML event problem report bundles 460 and/or may store and analyze the data included therein. For example, CIDB 640 may identify a hardware and/or software problem, analyze data relating to the identified problem, and/or determine reconfiguration information based on the analyzed data received within an XML event problem report bundle 460. The analysis performed by CIDB 640 may include any appropriate analysis algorithm such as, for example, a decision tree or an artificial intelligence database. The specific type of analysis performed by CIDB 640 may be determined by the type of network, event and/or data included within the XML event problem report bundles 460. For example, CIDB 640 may contain algorithms to perform trend analysis, detect increments of critical counter values, and measure or detect memory leaks, and may also create scripts based on the collected and analyzed data. For example, if a trend is positively identified by an algorithm, a script (reconfiguration information 570) may be created to reconfigure component(s) within network element 110 in order to adjust to the determined trend. If, for example, a component within network element 110 is positively identified by an algorithm within CIDB 640 as using 90% of the processor's resources, a script may be created to collect data from the identified component to further determine the nature of the problem. This script (reconfiguration information 570) may be transmitted from BND 150 to ICG 140.

Application integration module (APIM) 650 may include one or more mechanisms for receiving XML event problem report bundles 460 and communicating data between case manager 630 and CIDB 640.

User administration module 660 may include one or more mechanisms for allowing administrators to access information in BND 150, such as data stored in CIDB 640. For example, user administration module 660 may provide passwords for users and/or administrators, and may allow access to data via links, based on the user's/administrator's level of clearance.

Figure 7:
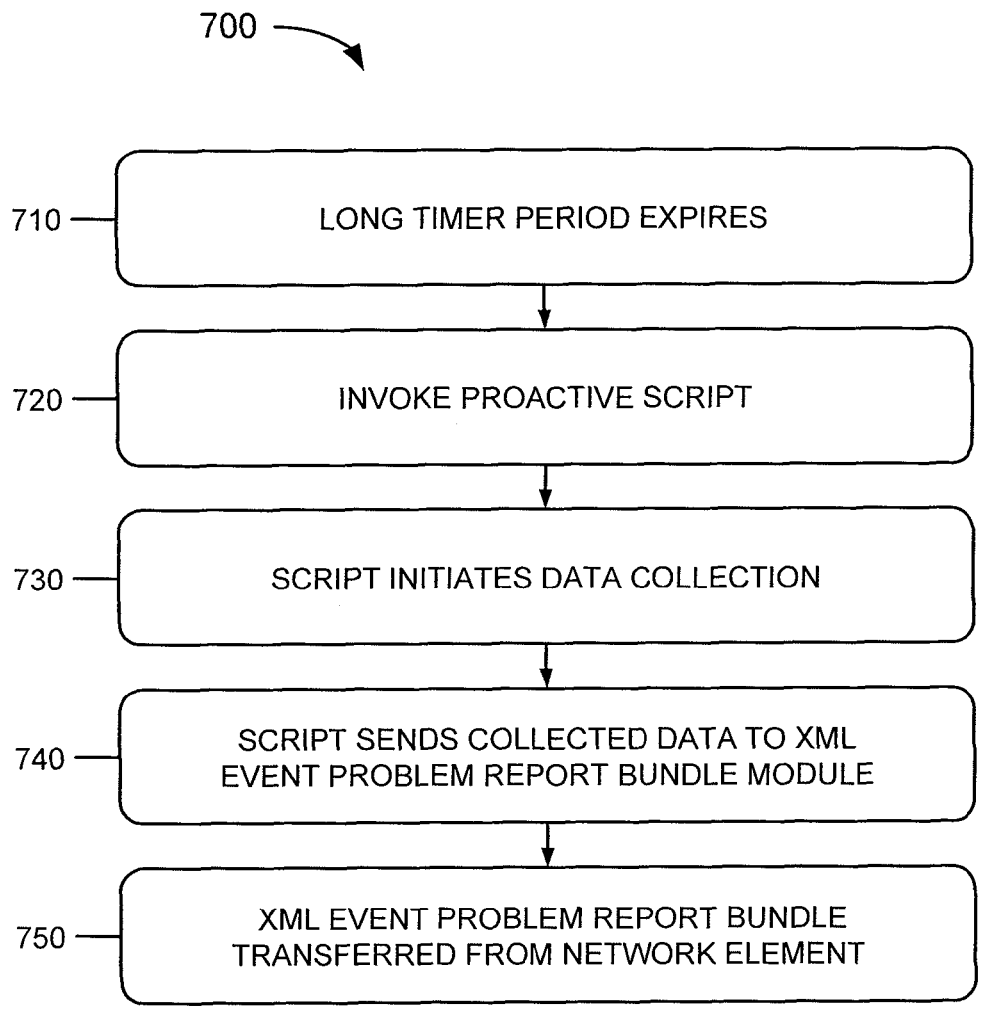
FIG. 7 is a flowchart of an exemplary proactive process.

FIG. 7 is a flowchart illustrating an exemplary proactive process 700 that may be performed in one of network elements 110. Process 700 may begin with expiration of a long timer value (block 710). For example, a timer value contained in XML event problem report bundle module 450 may expire. As described above, the timer values contained in XML event problem report bundle module 450 may be on the order of days, weeks, months, etc. Each individual timer value may include a corresponding proactive script contained in long timer based operations module 440 that is invoked upon timer expiration (block 720).

Once invoked, a proactive script may initiate data collection (block 730). For example, a script may initiate collection of data at one of interfaces 230 or an invoked script may initiate collection of data relating to the operations of processor 210. The invoked proactive script may send the collected data to XML event problem report bundle module 450 (block 740). Details of creating XML event problem report bundles 460 are described below in connection with FIG. 9.

Returning to FIG. 7, XML event problem report bundle 460 may be generated that contains the collected data that may relate to one of interfaces 230. The XML event problem report bundle 460 may be transferred to ICG 140 (block 750). For example, network element 110 may transmit an XML event problem report bundle 460 to ICG 140 for storage and analysis of the collected data. Further details of receiving and analyzing an XML event problem report bundle 460 are described below in connection with FIGS. 10 and 11.

Figure 8:
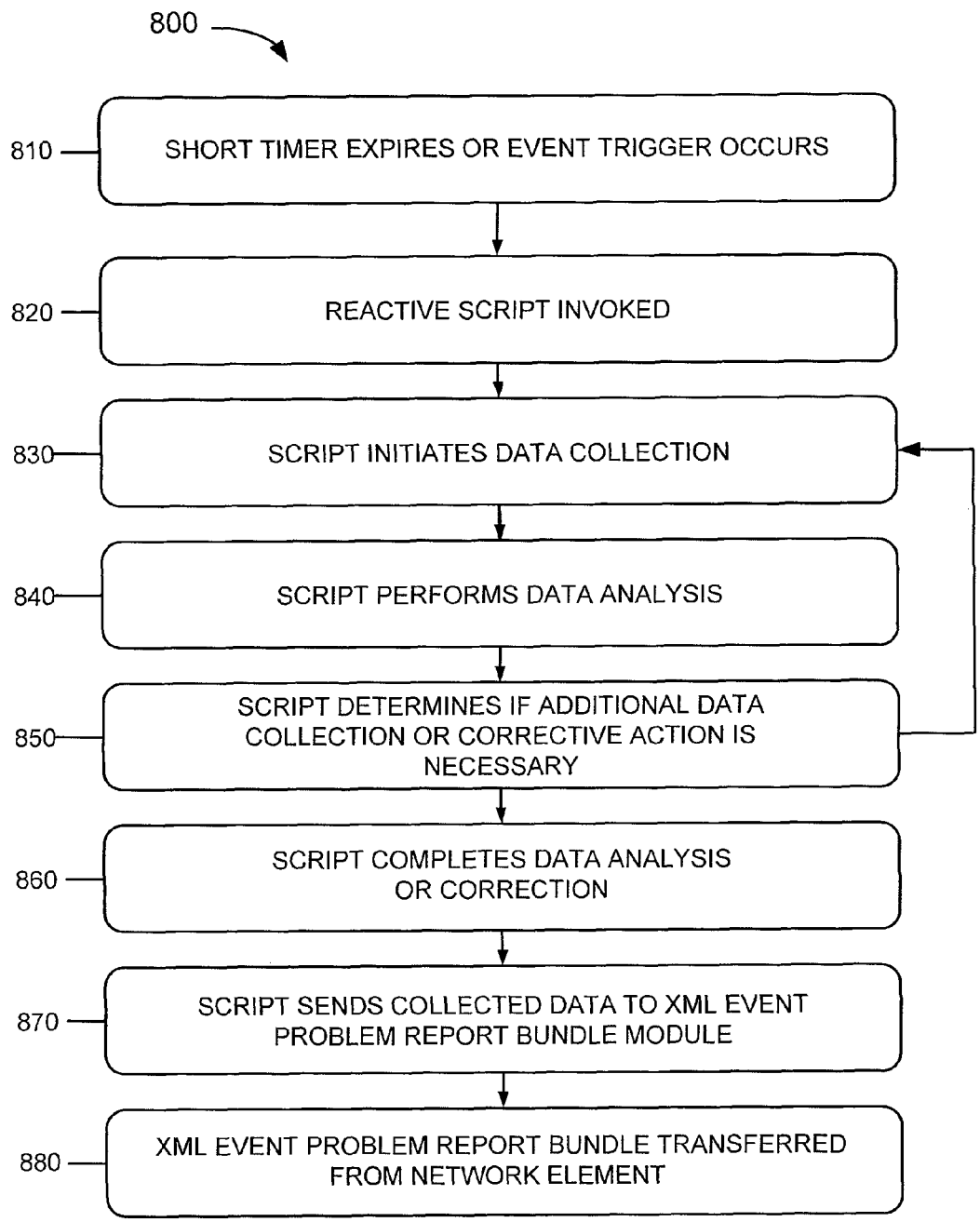
FIG. 8 is a flowchart of an exemplary reactive process.

FIG. 8 is a flowchart illustrating an exemplary reactive process 800 that may be performed in one of network elements 110. Process 800 may begin expiration of a short timer and/or occurrence of an event trigger (block 810). For example, event 410 may be received and may be compared to event policies contained in XML event problem report bundle module 450. Each event and short timer value in XML event problem report bundle module 450 may be associated with a corresponding reactive script contained in short timer based operations module 430. Upon detection of an event or time period, and association with event policies, XML event problem report bundle module 450 may invoke a reactive script contained in short timer based operations module 430 (block 820).

If invoked, a reactive script may initiate data collection (block 830). For example, received event 410 may result in invoking a reactive script contained in event trigger module 420. Received event 410 may be, for example, that 50% of memory 220 is being used, which may indicate a potential memory leak. Data may be collected relating to hardware aspects of memory 220 and data may be collected relating to software processes or operations that may currently be accessing memory 220. The data collected regarding the operation of memory 220 may be analyzed (block 840). For example, the analyzed data may indicate that hardware aspects of memory 220 are functioning properly. Other data collected by the invoked reactive script may relate to the amount of data stored in routing tables or forwarding tables contained in the routing information base (RIB). This data may be analyzed to determine if a certain portion (e.g., 50%) of memory usage is normal based on the information in the RIB.

Based on the analysis performed in block 840, the invoked script may determine if additional data collection may be necessary and/or if corrective action may be taken (block 850). Continuing with the above example, if the analysis of the data relating to the RIB indicates that the network element is currently receiving large amounts of data, a 50% memory usage may be determined to be acceptable and no corrective action may be taken, and script may complete the data analysis and/or corrective actions (block 860).

If, for example, analysis of the data indicates that a small amount of data is being received by network element 110, this may indicate that a memory leak is occurring and another reactive script may be invoked to collect data relating to other processes currently accessing memory 220 (block 850). An additionally invoked reactive script may collect and analyze data and determine that a software process is not releasing memory space within memory 220. In response to this analysis, the script may take corrective action by shutting down the detected faulty software process and/or launching another process to replace the faulty software (block 860).

The reactive script may send the collected data to XML event problem report bundle module 450 (block 870). For example, corrective actions taken and/or data collected by the invoked script may be sent to XML event problem report bundle module 450, so that an XML event problem report bundle 460 may be generated. Further details of generating an XML event problem report bundle 460 are described below in connection with FIG. 9. The generated XML event problem report bundle 460 may be transferred to ICG 140 (block 880). For example, an event problem report bundle 460 may be transferred from network element 110 to ICG 140 via network 120. Further details of receiving and processing an XML event problem report bundle 460 are described below in connection with FIGS. 10 and 11.

Figure 9:
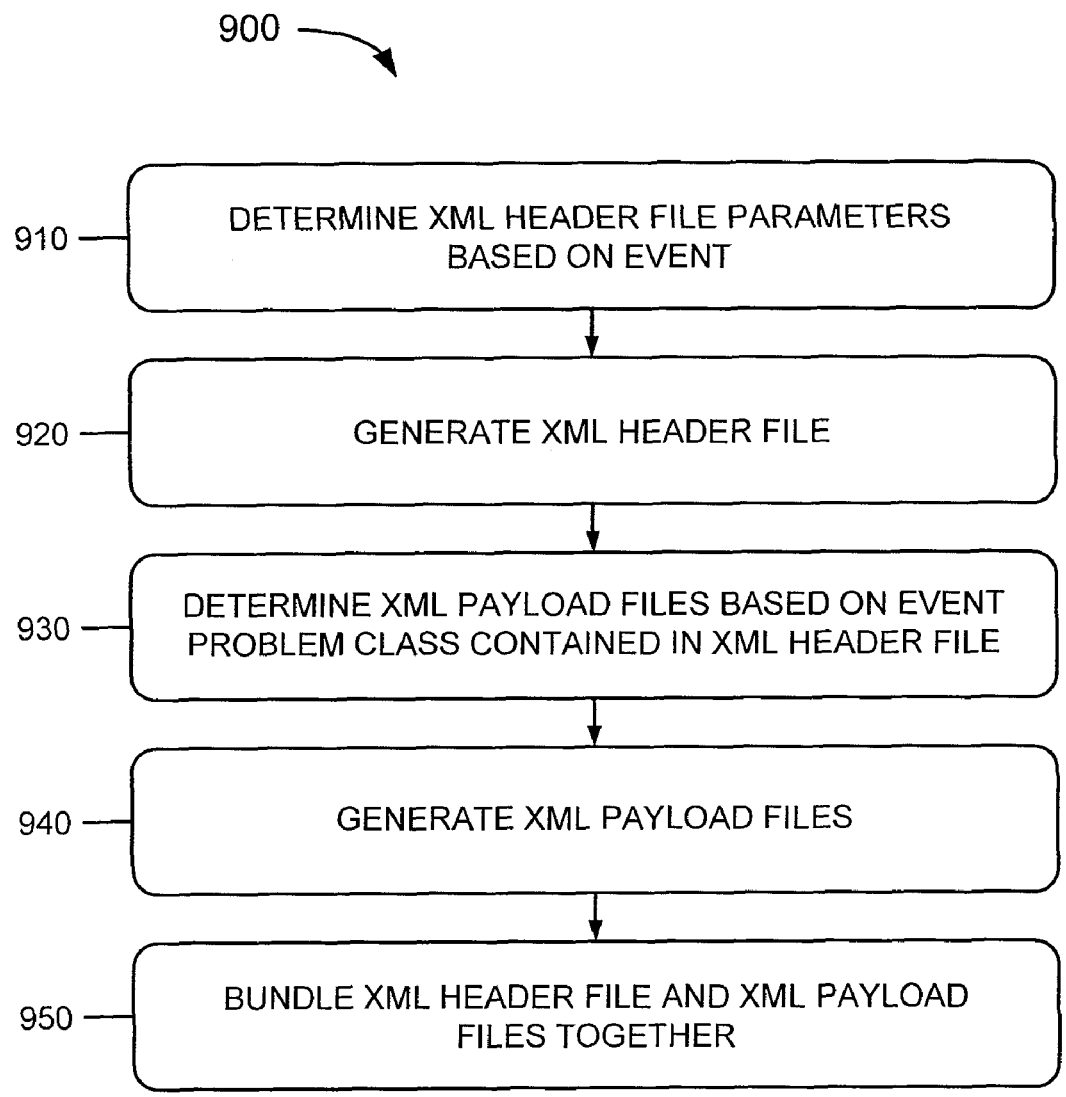
FIG. 9 is a flowchart of an exemplary process for creating Extensible Markup Language (XML) event problem report bundles.

FIG. 9 is a flowchart illustrating an exemplary XML event problem report bundle generation process 900. As mentioned above, process 900 may be enacted in blocks 740-750 (as shown in FIG. 7) or blocks 870-880 (as shown in FIG. 8). Process 900 may begin if XML event problem report bundle module 450 receives data collected by a script and determines an XML header file based on the event (block 910). For example, XML event problem report bundle module 450 may receive data collected by a script invoked by an event, and, based on the invoked script associated with this event, the appropriate XML header file structure and parameters may be selected. The XML header file parameters may include tagged fields of information such as, for example, host-event ID, event type, event problem class, event problem description, priority severity, problem priority, core file path, product name, host name, version information, time of event, core manifest, software stack trace, show chassis hardware, show chassis firmware, problem synopsis, etc.

After the appropriate XML header file parameters have been determined, the XML header file may be generated (block 920). For example, the information for each determined tagged field within the header may be completed and tagged. After the XML header file has been generated, XML payload files may be determined based on the event problem class field contained in the XML header file (block 930). For example, XML event problem report bundle module 450 may store and associate tagged fields of information that may be included in XML payload files for each type of problem class field in an XML header file. As described above, a software error identified in the problem class field of the XML header file may be associated with specific payload fields to be included in the XML payload files and a hardware failure identified in the event problem class field of the XML header file may be associated with specific payload fields to be included in the XML payload files.

After the appropriate XML payload files have been determined, the XML payload files may be generated (block 940). For example, information relating to the determined event problem class of the detected event may be tagged with the associated specific payload fields, to form an XML payload file as shown above. In other examples, attachment files that do not necessarily contain tagged fields, for example memory usage files, may be included in the XML payload files. If the XML payload files have been generated, XML event problem report bundle module 450 may bundle the XML header file and XML payload files together to form an XML event problem report bundle 460 (block 950). If bundled, the XML event problem report bundle 460 may be transmitted (as shown in blocks 750 and 880) to ICG 140. In this manner, XML event problem report bundle module 450 may provide a descriptive and flexible system of reporting events and/or errors within a network element 110.

Figure 10:
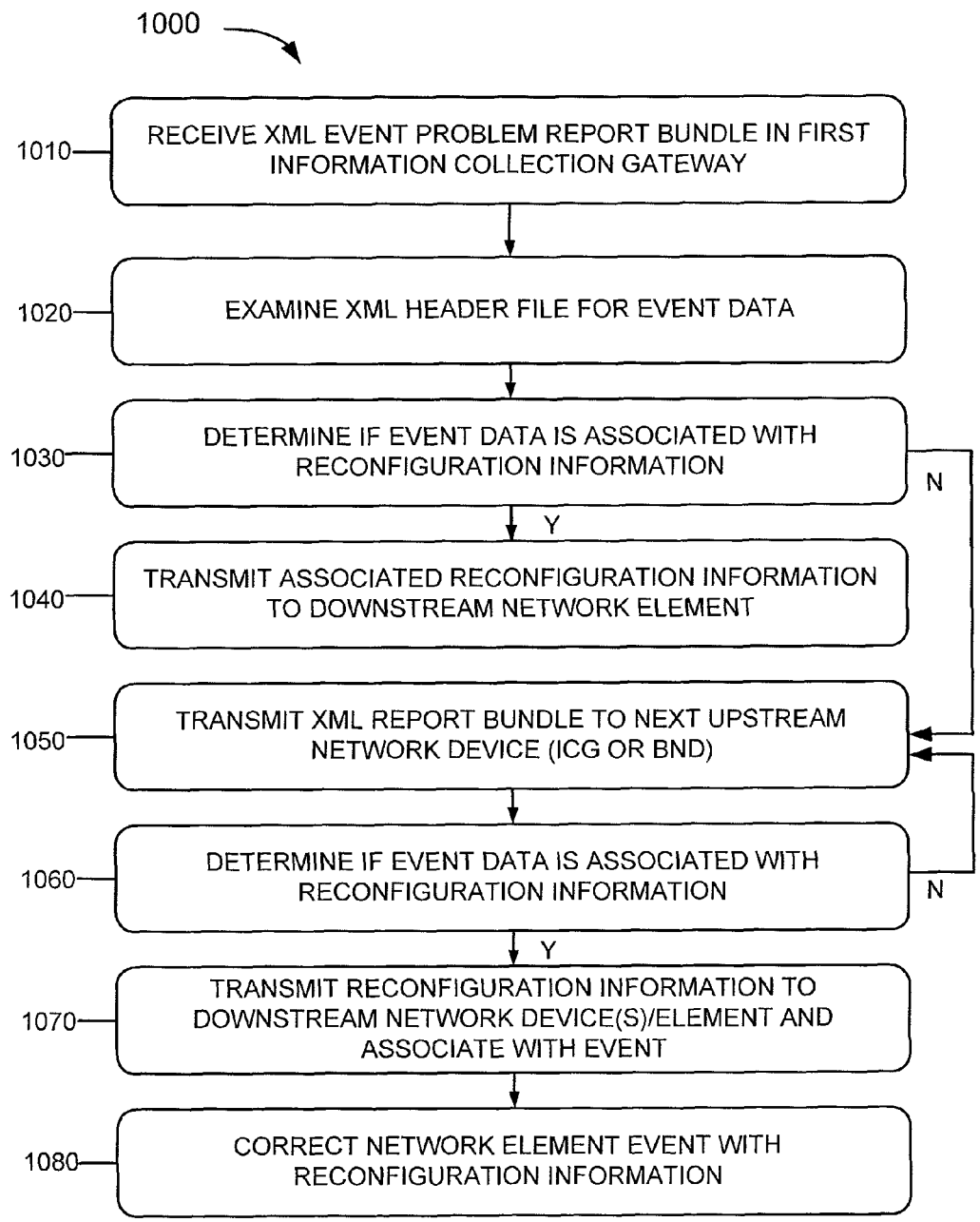
FIGS. 10 and 11 are flowcharts of exemplary processes for receiving and processing an XML event problem report bundle.

FIG. 10 is a flowchart illustrating an exemplary process 1000 for receiving an XML event problem report bundle 460. Process 1000 may begin when an XML event problem report bundle 460 is received by a first ICG 140 (block 1010). As shown in FIG. 1A for example, ICG 140-1 may receive an XML event problem report bundle 460 from network element 110 included in network 120-1. As shown in FIG. 1B for example, ICG 140-2 may receive an XML event problem report bundle 460 from network element 110 included in network 120-1. As shown in FIG. 1C for example, ICG 140-4 may receive an XML event problem report bundle 460 generated and transmitted from network element 110 included in network 120-3. After being received by ICG 140 the XML header file may be examined to determine the event data corresponding to an event (block 1020). For example, event manager 530 may include data mining and processing tools that may search for specifically identify events (e.g., in specific tagged fields of information, such as problem event class) contained within an XML header file. As described above, identified events and/or errors may relate to specifically identified processes and/or hardware components within a network element 110.

Additional processing performed in block 1020 after the event is identified by event manager 530, may also include notifying an operator and displaying the event information (contained within the received XML event problem report bundle 460). For example, ICG 140 may be programmed (via user interface 520) to automatically check for specific events/errors and/or a tagged problem severity field. In one example, if the information in the problem severity field is a "5" (where severity is ranked from 1 to 5, with 5 being the highest value), the event and/or information in the received XML event problem report bundle 460 may be displayed. ICG 140 may also instigate another action, such as sending an alert email (e.g., via notification manager 550), in response to the determination that a specific event/error has occurred (in block 1020).

Based on the event contained in the XML header file, it may be determined whether reconfiguration information is associated with the identified event (block 1030). For example, intelligence manager 540 may store and/or associate reconfiguration information 570 with corresponding events. As shown in FIG. 1A for example, intelligence manager 540 included in ICG 140-1 may contain event information gathered from previously received XML event problem report bundles 460 transmitted from any number of network elements 110 included in networks 120-1 and 120-2. As shown in FIG. 1B for example, intelligence manager 540 included in ICG 140-2 may contain event information gathered from previously received XML event problem report bundles 460 transmitted from any number of network elements 110 included in network 120-1. As shown in FIG. 1C for example, intelligence manager 540 included in ICG 140-4 may contain event information gathered from previously received XML event problem report bundles 460 transmitted from any number of network elements 110 included in network 120-3. Associated with each type of event, intelligence manager 540 may store reconfiguration information 570 that may have been previously transmitted from an upstream network device (i.e., ICG 140 or BND 150). As shown in FIG. 1A for example, reconfiguration information 570 may be received (in ICG 140-1) from BND 150. As shown in FIG. 1B for example, reconfiguration information 570 may be received (in ICG 140-2) from ICG 140-1. As shown in FIG. 1C for example, reconfiguration information 570 may be received (in ICG 140-4) from ICG 140-8.

When it is determined that reconfiguration information 570 is associated with the identified event (Yes in block 1030), the reconfiguration information 570 may be transmitted to the downstream network element 110 (block 1040). For example, if intelligence manager 540 has an updated software process stored and associated with an event related to an interface failure and a received XML event problem report bundle 460 contains information identifying the specific type of interface failure, the updated software process (reconfiguration information 570) may be transmitted to network element 110 from ICG 140. The received reconfiguration information 570 may then be used to reconfigure network element 110 and process 1000 may end.

When it is determined that the identified event received in the XML event problem report bundle 460 is not associated with reconfiguration information (No in block 1030), XML event problem report bundle 460 may be transmitted to the next upstream network device (block 1050). As shown in FIG. 1A for example, when it is determined that ICG 140-1 does not contain stored reconfiguration information associated with the received event, ICG 140-1 may transmit the XML event problem report bundle 460 to BND 150 for further analysis and/or processing (as described in FIG. 11). As shown in FIG. 1B for example, when it is determined that ICG 140-2 does not contain stored reconfiguration information associated with the received event, ICG 140-2 may transmit the XML event problem report bundle 460 to ICG 140-1 for further analysis and/or processing (as described below). As shown in FIG. 1C for example, when it is determined that ICG 140-4 does not contain stored reconfiguration information associated with the received event, ICG 140-4 may transmit the XML event problem report bundle 460 to ICG 140-8 for further analysis and/or processing (as described below).

Upon reception of a received XML event problem report bundle 460, the next upstream network device (ICG 140 or BND 150) may determine whether the received event is associated with reconfiguration information (block 1060). As shown in FIG. 1A for example, BND 150 may determine whether the received event is associated with reconfiguration information (block 1060). As shown in FIG. 1B for example, if ICG 140-1 may determine whether the received event is associated with reconfiguration information (block 1060). As shown in FIG. 1C for example, if ICG 140-8 may determine whether the received event is associated with reconfiguration information (block 1060).

In all of the examples described above referring to FIGS. 1A to 1C, when the upstream network device (ICG 140 or BND 150) determines that reconfiguration information 570 is stored and associated with the received event, reconfiguration information 570 may be transmitted to the downstream network device(s)/elements (block 1070).

As shown in FIG. 1A for example, when BND 150 determines that reconfiguration information 570 is stored and associated with the received event (Yes in block 1060), reconfiguration information 570 may be transmitted to ICG 140-1 (block 1070). Upon reception of this reconfiguration information 570, ICG 140-1 may store and associate the reconfiguration information 570 with event data in intelligence manager 540. ICG 140-1 may then also transmit reconfiguration information 570 to network element 110 (block 1070). The received reconfiguration information 570 may then be used to correct the event or error that occurred within network element 110 in network 120-1 (block 1080). As process 1000 may be performed any number of times, for any number of different events, intelligence manager 540 included in ICG 140-1 may continue to store and associate events with reconfiguration information 570. In this manner, ICG 140-1 may be configured to directly provide reconfiguration information 570 to a network element 110 included in either of networks 120-1 and 120-2, without requiring analysis or processing from BND 150, for example.

As shown in FIG. 1B for example, when ICG 140-1 determines that reconfiguration information 570 is stored and associated with the received event (Yes in block 1060), reconfiguration information 570 may be transmitted to ICG 140-2 (block 1070). Upon reception of this reconfiguration information 570, ICG 140-2 may store and associate the reconfiguration information 570 with the event data (in intelligence manager 540). ICG 140-2 may then also transmit reconfiguration information 570 to network element 110 network 120-1 (block 1070). The received reconfiguration information 570 may then be used to correct the event or error that occurred within network element 110 (block 1080). As process 1000 may be performed any number of times, for any number of different events, intelligence manager 540 included in ICGs 140-1 and 140-2 may continue to store and associate events with reconfiguration information 570. In this manner, ICG 140-1 may now be configured to correct an event received from ICG 140-3 (included in network 120-2) using reconfiguration information 570 stored and associated with an event received from network 120-1. In this manner, downstream network devices may constantly receive and update reconfiguration information 570 in order to reduce analysis and/or processing needed from upstream network devices, for example.

As shown in FIG. 1C for example, when ICG 140-8 determines that reconfiguration information 570 is stored and associated with the received event (Yes in block 1060), reconfiguration information 570 may be transmitted to ICG 140-4 (block 1070). Upon reception of this reconfiguration information 570, ICG 140-4 may store and associate the reconfiguration information 570 with the event data (in intelligence manager 540). ICG 140-4 may then also transmit reconfiguration information 570 to network element 110 network 120-3 (block 1070). The received reconfiguration information 570 may then be used to correct the event or error that occurred within network element 110 (block 1080). As process 1000 may be performed any number of times, for any number of different events, intelligence manager 540 included in downstream ICGs 140-4 and 140-8 may continue to store and associate events with reconfiguration information 570. In this manner, ICG 140-8 may now be configured to correct an event received from ICG 140-5 (included in network 120-4) using reconfiguration information 570 stored and associated with an event received from network 120-3. In this manner, downstream network devices may constantly receive and update reconfiguration information 570 in order to reduce analysis and/or processing needed from upstream network devices, for example.

If for example, reconfiguration information 570 is not associated with the received event (No in block 1060), XML event problem report bundle 460 may be transmitted to the next upstream network device (block 1050). Although not shown, there may be any number of networks 120 between a network element 110 and BND 150, for example. When this is the case, process 1000 may continue to enact blocks 1050 and 1060 recursively until an ICG 140 determines that reconfiguration information 570 is stored and associated with the event received in the XML event problem report bundle 460. Continuing with this example, if no ICG 140 stores reconfiguration information 570 associated with the event received in the XML event problem report bundle 460, the XML event problem report bundle 460 may finally be received at BND 150 (to be processed as described below in FIG. 11).

It should also be understood that each transmission of an XML event problem report bundle 460 from one ICG 140 to the next upstream ICG 140 (block 1050) may include a filtering process. For example, data filtering manager 560 may automatically identify events and/or information in received XML event problem report bundles 460 that should not be transmitted to the next upstream ICG 140 (or BND 150). For network security reasons for example, data filtering manager 560 may automatically identify XML event problem report bundles 460 that may contain confidential information that should not be transmitted to the next upstream network device (i.e. ICG 140 or BND 150).

In addition to automatically determining whether to transmit XML event problem report bundles 460 to the next upstream network device (as described in blocks 1030 and 1060), a network operator may also examine the event data (at each ICG 140, in blocks 1030 and 1060) to determine if the event and/or problem included in the XML event problem report bundle 460 can be identified/solved (by the network operator) or if the XML event problem report bundle 460 needs to be transmitted to the next upstream network device (i.e. ICG 140 or BND 150). As shown in FIG. 1C for example, ICG 140-8 may receive an XML event problem report bundle 460 from ICG 140-5 originally generated from a network device in network 120-4. In response to receiving an XML event problem report bundle 460, ICG 140-8 may create a link to the event data and XML payload files included in the received XML event problem report bundle 460.

For example, a network operator connected to managing service provider network 130-2 may use a web browser application to access a link created by ICG 140-8. Upon activating the link, logging in, providing a password/level of clearance etc., a network operator may view/analyze all the data included in the received XML event problem report bundle 460. A network operator may then use their personal knowledge of network events/problems to identify a problem or potential problem that may not have been automatically identified (solved) by ICG 140-8. In this manner, ICG 140-8 may provide a platform on which a managing service provider network operator may add value and further analyze event data before deciding to send the XML event problem report bundle 460 to the next upstream device. For example, a network operator may be aware of analysis methods or tools not provided within an ICG 140 and may desire to use such methods to analyze data within a received XML event problem report bundle 460.

In one example, if the network operator successfully solves/identifies a problem, they may decide not transmit the XML event problem report bundle 460 to the next upstream device (Yes—in block 1030). In another example, if the network operator can not successfully solve/identify a problem, they may decide to transmit the XML event problem report bundle 460 to the next upstream device (BND 150 for example) for further analysis (No—in block 1030). In the above examples, the manufacturer or vendor of network elements 110 may sell it's products to managing service providers (networks 130-1 and 130-2) at a discount, where the discount is offered based on the managing service provider's involvement in solving (or attempting to solve) the events/problems included in XML event problem report bundles 460. Additionally, a burden on the vendor is reduced by solving problems at the managing service provider network level.

Continuing with this example, if a network operator of managing service provider network 130-2 can not identify/solve an error after analysis of the data, the network operator may decide to transmit the XML event problem report bundle 460 to the vendor (BND 150) (block 1050). Upon receiving the XML event problem report bundle 460, BND 150 may create a link to the data contained therein. A vendor network operator connected to backend network 160 may use a web browser application to access a link created by BND 150. Upon activating the link, the vendor network operator may view/analyze all the data included in the received XML event problem report bundle 460. A vendor network operator may then use their personal knowledge of network events/problems to identify a problem or potential problem that may not have been identified by a network operator of a managing service provider.

Additionally, while an analysis of the event data is being performed within backend network 160 (as described in more detail in FIG. 11), BND 150 may create a link that may be accessed by a network operator within managing service provider network (130-2, for example). Upon accessing this link, a managing service provider network operator may receive status information related to the event and when analysis is completed, the analysis information may be accessed via this link. In this manner, a managing service provider network 130-2 may receive solutions to network events and provide this information to it's customer (i.e., network 120-4) without the customer being aware that the solution came from the vendor. For example, a new software process or script (reconfiguration information 570) may be provided to a customer (in network 120-4) via a link created by ICG 140-8, or may be transmitted to ICG 140-5 (from ICG 140-8) to be forwarded to correct an error within a network element 110 within network 120-4 (block 1080).

Although only one managing service provider network (130-2) is shown between an end-user (customer, i.e., network 120-4) and a vendor (backend network 160), it should be understood that any number of managing service provider (networks) may be included between the end-user and the vendor. For example, there may be two or three managing service provider networks 130 between the end-user and the vendor, where an ICG 140 may be included within each managing service provider network. As described above, link(s) may be created by each ICG 140 where both the upstream and downstream network operators may access these links to receive status information, analysis information, reconfiguration information 570, updates, etc.

Figure 11:
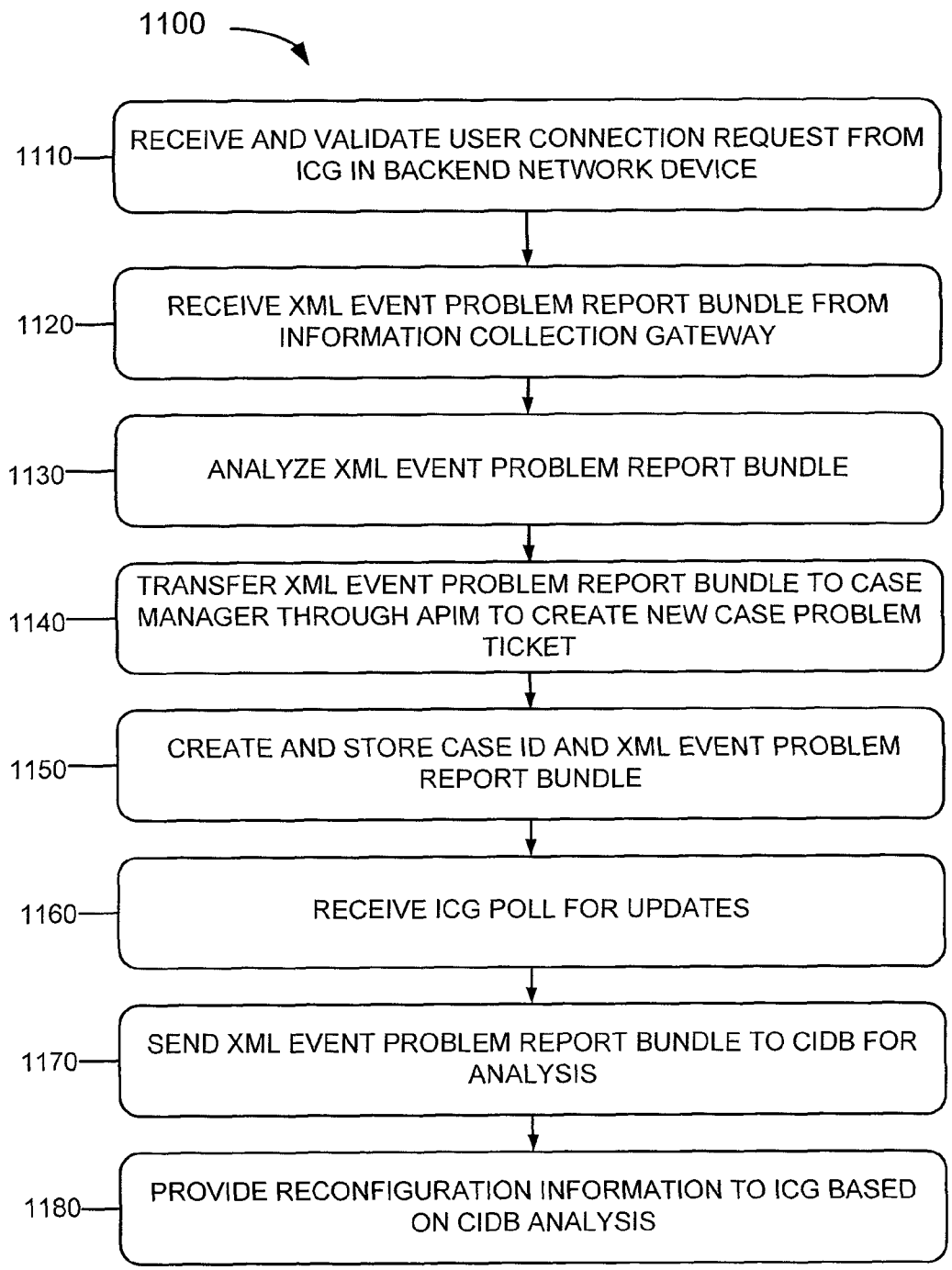

FIG. 11 is a flowchart illustrating an exemplary process 1100 for receiving and processing an XML event problem report bundle 460 in BND 150. Process 1100 may begin when BND 150 receives and validates a user connection request (block 1110). For example, ICG 140 may transmit an XML event problem report bundle 460 to BND 150, where information in the received XML event problem report bundle 460 may include user information that may identify a particular network or identify a particular ICG 140. Upon confirmation and validation of the user connection request, the XML event problem report bundle 460 transmitted from ICG 140 may be received by BND 150 (block 1120).

After receiving the XML event problem report bundle 460, the data may be analyzed (block 1130). For example, BND 150 may contain information gathered from previously received XML event problem report bundles 460 (from a number of different networks, such as networks 120-3 to 120-6, as shown in FIG. 1C) and may determine and associate a new software process or script based on the analyzed data. For example, upon analysis of the data within an XML event problem report bundle 460, BND 150 may determine that a software process contained in a network element 110 is more than one year old and a new updated software process (reconfiguration information 570) may correct an event that occurred within a network element 110.

After analyzing the data, the XML event problem report bundle 460 may be transmitted through the APIM 650 to case manager 630 to create a new case problem ticket (block 1140). Case manager 630 may create and store a case ID and store the received XML event problem report bundle 460 (block 1150). For example, case manager 630 may contain a customer relationship manager (CRM) tool that may directly map to and extract information contained in the XML header file in order to form a new case problem ticket. For example, information contained in tagged fields, such as for example, event problem description, platform, time of problem, serial number, priority, severity of event, may be automatically extracted and a placed into a new case problem ticket. Further, using a CRM tool contained in case manager 630 allows for tagged fields to be specifically identified for each different customer. As shown in FIG. 1C for example, one managing service provider using network 130-2 (such as "company I") may be concerned with one type of tagged error field that commonly occurs within it's managed networks 120-3 and 120-4. A second managing service provider using network 130-3 (such as "company J") may be concerned with another type of tagged error field that commonly occurs within it's managed networks 120-5 and 120-6. In this manner, case manger 630 may "customize" new case problem tickets for each different customer.

In further examples, BND 150 may create a link based on the received XML event problem report bundle 460. In this manner, while performing further analysis of data included within the XML event problem report bundle 460, a downstream network operator may click on a link to receive status reports and/or analysis information related to the event/error included in the XML event problem report bundle 460.

After creating a case ID and new case problem ticket, BND 150 may receive a poll from ICG (block 1160). As shown in FIG. 1B for example, ICG 140-1 may periodically poll BND 150 for updated information relating to the created case ID. If BND 150 has determined a software solution or new script, this reconfiguration information 570 may be obtained by ICG 140-1 during a backend network device poll or may be obtained via a link.

BND 150 may continue to process data received in an XML event problem report bundle 460 by sending the XML event problem report bundle 460 to CIDB 640 for analysis (block 1170). For example, the analysis performed by CIDB 640 may include any appropriate analysis algorithm such as, for example, a decision tree or an artificial intelligence database. The specific type of analysis performed by CIDB 640 may be determined by the type of network, error and/or data contained within XML event problem report bundle 460. CIDB 640 may contain algorithms to perform trend analysis, detect increments of critical counter values and measure or detect memory leaks, and may also create new software processes and/or scripts based on the collected and analyzed data. For example, if a trend is positively identified by CIDB 640, an additional script (reconfiguration information 570) may be created to reconfigure component(s) within network element 110 in order to adjust to the determined trend. In another example, if a specific software process is identified as potentially faulty by CIDB 640, a new script (reconfiguration information 570) may be created that contains new parameters to monitor within a network element 110.

Additionally, as BND 150 may receive XML event problem report bundles 460 from a plurality of network elements 110 within a plurality of different networks, BND 150 and/or a vendor network operator may perform an exposure analysis to identify potential problems (bugs) that may apply to all network elements 110 within the connected networks 120. For example, based on analyzed error/event data received from network 120-7, BND 150 may determine that network elements 110 within network 120-6 may be exposed to a similar error/event, although none of the network elements 110 in network 120-6 have generated XML event problem report bundles 460 that include this error/event information. The analysis and results determined by CIDB 640 may be placed in a queue (or obtained by activating a link), such that ICG 140-6 (or a network operator in network 120-6) may acquire these results. Once ICG 140-6 obtains the analysis data, a service provider network operator may determine which network elements 110 within network 120-6 may be exposed to this type of error. Similarly, a managing service provider network operator (connected to network 130-2) may receive exposure analysis information and/or a list of devices that show which type of network elements 110 located in network 120-3 or 120-4 (or both) may need to be reconfigured to avoid specific types of errors. Therefore, BND 150 may provide analysis and/or reconfiguration information 570 that may reconfigure network elements 110 before an error has actually occurred. In this manner, network operators within service provider networks 130 may consult the vendor to be alerted to, and compensate for, errors before they occur.

In response to further ICG 140 polls, BND 150 may provide reconfiguration information 570 to ICG 140 based on the analyzed data (block 1180). As described above, the reconfiguration information 570 determined and produced by CIDB 640 may be obtained by ICG 140 or by activating a link. Once obtained by an ICG 140, the ICG 140 and/or a network operator of a managed network service provider may determine which network elements 110 may receive the appropriate reconfiguration information 570 in order to correct (or proactively avoid) errors. As BND 150 may receive XML event problem report bundles 460 from a plurality of network elements 110 within a plurality of different networks (such as networks 120-3 to 120-6 as shown in FIG. 1C), BND 150 may determine and proactively compensate for trends or tendencies within network elements 110 that may be undetectable by existing systems.

Additionally, BND 150 may determine and/or display a map of all channel connections through ICGs 140 and network elements 110, transmitted via all connected networks 120 and 130. For example, information identifying the device and network of each network device that received/transmitted an XML event problem report bundle 460 may be added by each network device (i.e., network elements 110 and ICGs 140) as the XML event problem report bundle 460 is transmitted to BND 150. BND 150 may extract this information to produce a channel map that shows/identifies network communication channels and devices. For example, BND 150 may be able to generate and display a graphic network picture as shown in FIG. 1C. For example, each type of network device (i.e., network elements 110 and ICGs 140) may be represented by an appropriate shape, each network (120 and 130) may be represented as a cloud and each channel of communication may be represented by a connecting line. In this manner a vendor network operator may be able address network issues based on displayed channel map information, which would previously be unavailable to network operators. This may allow the vendor to offer products and services to downstream networks (120 and 130) based on the determined/displayed channel configuration.

Therefore the exemplary systems and processes described above may provide an intelligent, descriptive, and/or flexible platform of analyzing and reporting event data upstream through a number of network devices at all network levels. Further, the systems and processes described may provide an analysis of errors (performed by a vendor) and provide reconfiguration information that may be used to avoid errors in a network element 110 before they occur.

The foregoing description of implementations provides an illustration, but is not intended to be exhaustive or to limit the implementations to the precise form disclosed. Modifications and variations are possible in light of the above teachings or may be acquired from practice of the teachings.

In addition, while series of blocks have been described with regard to the processes illustrated in FIGS. 7-11, the order of the blocks may be modified in other implementations. Further, non-dependent blocks may represent blocks that can be performed in parallel. For example, blocks 1110-1180 that are performed for one received XML event problem report bundle 460 may be independent of blocks 1110-1180 for a second received XML event problem report bundle 460, and therefore, may be performed in parallel. Also, it may be possible to omit blocks within a process.

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, an application specific integrated circuit, or a field programmable gate array, software, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, block, or instruction used in the present application should be construed as critical or essential to the implementations described herein unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A network device in a first network, the network device comprising:
   logic, implemented at least partially in hardware, to:
   receive a problem report from a second network device in a second network, the problem report including event data;
   receive reconfiguration information from a third network device in a third network;
   determine whether the received reconfiguration information is associated with the event data in the received problem report;
   transmit the reconfiguration information to the second network device when the reconfiguration information is associated with the event data in the received problem report; and
   transmit the received problem report to the third network device when the reconfiguration information is not associated with the event data in the problem report.

2. The network device of claim 1, where the problem report is generated by the second network device.

3. The network device of claim 2, where the logic is further configured to:
   identify a type of event that occurred in the second network device that generated the problem report.

4. The network device of claim 3, where the logic is further configured to:
   receive a problem report from a fourth network device in a fourth network; and
   associate event data in the received problem report from the fourth network device with the received reconfiguration information from the third network device.

5. The network device of claim 3, where the logic is further configured to:
   notify an operator that a determined type of event has occurred.

6. The network device of claim 1, where the logic is further configured to:
   filter data in a problem report to determine when the problem report is to be transmitted to the third network device; and
   transmit the problem report to the third network device when the problem report is to be transmitted.

7. The network device of claim 1, where the reconfiguration information includes at least one of a software process or a script.

8. The network device of claim 1, where the first network is a managed service provider for the second network.

9. The network device of claim 8, where the third network is operated by a vendor of the second network device in the second network.

10. A method comprising:
    receiving a first problem report from a first network device in a first network;
    receiving a second problem report from a second network device in a second network;
    receiving reconfiguration information from a third network device in a third network;
    storing event data included in the first and second problem reports;
    determining whether the event data included in the first and second problem reports is associated with the reconfiguration information;
    transmitting at least one of the first problem report or the second problem report to the third network device when the reconfiguration information is not associated with the event data included in the first problem report or the second problem report; and transmitting the reconfiguration information to at least one of the first network device or the second network device when the reconfiguration information is associated with the event data included in the first problem report or the second problem report.

11. The method of claim 10, further comprising:
determining types of event data included in the first and second problem reports.

12. The method of claim 11, further comprising:
receiving subsequent problem reports from network devices included in the first and second networks.

13. The method of claim 12, further comprising:
determining types of event data included in the subsequent problem reports.

14. The method of claim 13, further comprising:
transmitting reconfiguration information to a network device, of the network devices, that transmitted a subsequent problem report when the reconfiguration information is associated with the determined type of event data included in the subsequent problem report.

15. The method of claim 14, further comprising:
transmitting the subsequent problem report to the third network device when there is no reconfiguration information associated with the determined type of event data included in the subsequent problem report.

16. The method of claim 15, where the third network device includes a customer intelligence database, and where the event data included in the subsequent problem report is stored and analyzed in the customer intelligence database.

17. The method of claim 16, where the reconfiguration information is determined by the third network device and the reconfiguration information includes at least one of a software process or a script.

18. The method of claim 17, where the reconfiguration information corrects an event that occurred in the first network device or the second network device.

19. The method of claim 17, where the third network is a vendor of the first and second network devices.

20. A network device comprising:
a processor to:
receive problem reports from a plurality of downstream network devices;
identify events included in the problem reports;
receive reconfiguration information from an upstream network device;
transmit the reconfiguration information to a downstream network device when the reconfiguration information is associated with an identified event; and
transmit at least one of the problem reports to the upstream network device when the reconfiguration information associated is unassociated with the identified events.

* * * * *

UNITED STATES PATENT AND TRADEMARK OFFICE
CERTIFICATE OF CORRECTION

PATENT NO. : 8,264,974 B1  
APPLICATION NO. : 12/196497  
DATED : September 11, 2012  
INVENTOR(S) : Dogu Narin et al.

Page 1 of 1

It is certified that error appears in the above-identified patent and that said Letters Patent is hereby corrected as shown below:

Claim 20, column 24, lines 26 and 27 should read: "information is unassociated with the identified events."

Signed and Sealed this  
Twenty-third Day of October, 2012

David J. Kappos  
*Director of the United States Patent and Trademark Office*